US011881636B2

(12) United States Patent
Reitner et al.

(10) Patent No.: US 11,881,636 B2
(45) Date of Patent: Jan. 23, 2024

(54) PRINTED CIRCUIT BOARD ANTENNA

(71) Applicant: BSH Hausgeraete GmbH, Munich (DE)

(72) Inventors: Josef Reitner, Donaustauf (DE); Ludwig Stoeckl, Undorf (DE)

(73) Assignee: BSH Hausgeraete GmbH, Munich (DE)

( * ) Notice: Subject to any disclaimer, the term of this patent is extended or adjusted under 35 U.S.C. 154(b) by 296 days.

(21) Appl. No.: 17/441,548

(22) PCT Filed: Apr. 2, 2020

(86) PCT No.: PCT/EP2020/059388
§ 371 (c)(1),
(2) Date: Sep. 21, 2021

(87) PCT Pub. No.: WO2020/212153
PCT Pub. Date: Oct. 22, 2020

(65) Prior Publication Data

US 2022/0181777 A1 Jun. 9, 2022

(30) Foreign Application Priority Data

Apr. 17, 2019 (DE) ......................... 102019205556.7

(51) Int. Cl.
*H01Q 5/357* (2015.01)
*H01Q 1/38* (2006.01)

(52) U.S. Cl.
CPC ............... *H01Q 5/357* (2015.01); *H01Q 1/38* (2013.01)

(58) Field of Classification Search
CPC .......... H05B 6/6444; H05B 6/70; H05B 6/72; H01Q 1/2291; H01Q 1/38; H01Q 1/48;
(Continued)

(56) References Cited

U.S. PATENT DOCUMENTS

| | | |
|---|---|---|
| 6,300,908 B1 | 10/2001 | Jecko et al. |
| 7,196,664 B2 | 3/2007 | Asai |

(Continued)

FOREIGN PATENT DOCUMENTS

| | | |
|---|---|---|
| CN | 1299525 A | 6/2001 |
| CN | 1624976 A | 6/2005 |

(Continued)

*Primary Examiner* — Monica C King
(74) *Attorney, Agent, or Firm* — Laurence A. Greenberg; Werner H. Stemer; Ralph E. Locher

(57) ABSTRACT

A printed circuit board antenna contains an electrically conductive antenna structure on an outer layer of a printed circuit board, the antenna structure has a first resonance frequency. The printed circuit board antenna additionally contains an electrically conductive feed line to the antenna structure and an electrically conductive reference region on the outer layer. The reference region completely encloses the antenna structure with the exception of an insulating feed recess for the feed line and an insulating web recess. The web recess is arranged on the antenna structure face facing away from the feed line, and the reference region has a reference region web on the antenna structure face facing away from the feed line. The reference region web forms a resonator which is capacitively coupled to the antenna structure and has a second resonance frequency.

20 Claims, 5 Drawing Sheets

(58) Field of Classification Search
CPC ........ H01Q 13/10; H01Q 5/328; H01Q 5/357; H01Q 9/0421; H01Q 9/42; H01Q 1/241; H01Q 1/50; H01Q 5/10; H01Q 5/20; H01Q 5/50; H01Q 1/243; H01Q 1/36; H01Q 5/371; H01Q 5/378; H01Q 5/40; H01Q 7/005; H01Q 9/0407; H03H 7/38; H03H 2007/386; H03H 7/40; H04B 1/0092; H04B 1/18
See application file for complete search history.

(56) References Cited

U.S. PATENT DOCUMENTS

| | | | | |
|---|---|---|---|---|
| 7,825,863 | B2 | 11/2010 | Martiskainen et al. | |
| 8,587,491 | B2 * | 11/2013 | Badaruzzaman ...... | H01Q 5/357 343/702 |
| 9,478,859 | B1 * | 10/2016 | Nair ..................... | H01Q 1/2291 |
| 9,660,347 | B2 | 5/2017 | Du et al. | |
| 10,326,206 | B2 | 6/2019 | Girard | |
| 10,965,034 | B2 * | 3/2021 | Zhinong .................. | H01Q 1/48 |
| 2005/0176390 | A1 | 8/2005 | Navsariwala et al. | |
| 2010/0103069 | A1 | 4/2010 | Wang et al. | |
| 2013/0033410 | A1 | 2/2013 | Wong et al. | |
| 2013/0076587 | A1 | 3/2013 | Wong et al. | |
| 2016/0218421 | A1 | 7/2016 | Lin | |
| 2018/0026371 | A1 * | 1/2018 | Chang .................... | H01Q 5/392 343/833 |
| 2019/0103682 | A1 * | 4/2019 | Thai ..................... | H01Q 21/064 |

FOREIGN PATENT DOCUMENTS

| | | | |
|---|---|---|---|
| CN | 1918920 | A | 2/2007 |
| CN | 103414018 | A | 11/2013 |
| CN | 103490154 | A | 1/2014 |
| CN | 105826662 | A | 8/2016 |
| CN | 106159422 | A | 11/2016 |
| CN | 107078385 | A | 8/2017 |
| CN | 108023166 | A | 5/2018 |
| WO | 9943037 | A2 | 8/1999 |
| WO | 2008059509 | A2 | 5/2008 |
| WO | 2015148298 | A1 | 10/2015 |

* cited by examiner

PRINTED CIRCUIT BOARD ANTENNA

FIELD AND BACKGROUND OF THE INVENTION

The invention relates to an antenna for transmitting or receiving radio signals, which can be implemented on a printed circuit board.

An electronic device, which is designed to communicate by way of a wireless communication network, typically comprises at least one antenna for receiving and/or for emitting radio signals. Here the electronic device can be designed to receive or transmit radio signals by way of a plurality of different frequency bands, in particular by way of two different frequency bands or frequency ranges. For this purpose, the device can comprise a multi-band antenna, in particular a dual band antenna. Exemplary dual band antennas can be provided e.g. for the frequency bands 2.4-2.5 GHz and 5.1-5.8 GHz, i.e. for WLAN (Wireless Local Area Network).

Antennas typically require a reference mass or reference plane for their function. The size and the shape of a reference mass of this type typically have a significant influence on the function and radiation characteristics of an antenna. An antenna is frequently intended to be used as a circuit board structure or as an attached metal structure (e.g. as a stamped bent part) in circuit boards of various sizes. The circuit boards of various sizes represent reference masses which are developed differently for an antenna. Furthermore, plastic in the environment of the antenna (e.g. on account of a housing) can also influence the properties of an antenna. As a result, a new antenna adjustment is typically required for each circuit board geometry and/or use. An antenna adjustment of this type can be effected by changing the antenna structure and/or by using what is known as a "matching circuit".

The present document relates to the technical object of providing a (dual band) antenna, which can be integrated efficiently (in particular without requiring a dedicated antenna adjustment) onto conductor boards which are developed differently.

SUMMARY OF THE INVENTION

The object is achieved by the independent claim. Advantageous embodiments are described inter alia in the dependent claims.

According to one aspect, a printed circuit board antenna is described. Here the printed circuit board antenna described in this document can be implemented efficiently on differently dimensioned printed circuit boards and/or in different environments and/or applications. A printed circuit board here typically comprises an electrically conducting (first) outer layer (e.g. a front layer) and an electrically conducting further (second) outer layer (e.g. a lower layer). The one or more layers can be electrically insulated from one another by means of one or more dielectric layers. The layers can comprise an electrically conducting material, in particular copper. Here the electrically conducting material can be removed at least in regions from the respective layer, in particular in order to form a clearance between an antenna structure and a reference region.

The printed circuit board antenna comprises an electrically conducting antenna structure on the (first) outer layer of the printed circuit board. The antenna structure here can have an elongated form (e.g. such as a dipole antenna). In particular, the antenna structure can form an inverted F antenna. Furthermore, the antenna structure can have a first resonance frequency. In particular, the antenna structure can be embodied to form a first antenna for a first frequency range about the first resonance frequency. The first frequency range can comprise in particular 5.1-5.8 GHz or correspond to this frequency interval.

Furthermore, the printed circuit board antenna has an electrically conducting reference region on the outer layer. Here the reference region can be connected in an electrically conducting manner to a ground of the printed circuit board. In particular, the reference region can be embodied to form a reference ground for the antenna structure, so that the printed circuit board antenna is independent of a size of the reference mass.

Furthermore, the printed circuit board antenna has an electrically conducting feed line to the antenna structure. The feed line can be arranged substantially at right angles to the longitudinal alignment of the antenna structure. A radio signal received by the antenna structure can be decoupled by way of the feed line. On the other hand, a radio signal to be transmitted by the antenna structure can be fed into the antenna structure by way of the feed line.

The reference region can be embodied to enclose the antenna structure completely or partially with the exception of an insulating feed recess for the feed line and with the exception of an insulating web recess. Here the web recess can be arranged on a side of the antenna structure which faces away from the feed line. The reference region can therefore be divided into (if applicable, precisely) two parts by means of the two recesses, i.e. into a first sub reference region and into a second sub reference region.

The reference region, in particular the first sub reference region, can have a reference region web on the side of the antenna structure facing away from the feed line. The reference region web can be connected in an electrically conducting manner to the first sub reference region. Furthermore, the reference region web can form a resonator, coupled capacitively to the antenna structure, with a second resonance frequency. The reference region web can have an elongated shape (and thus form e.g. a dipole antenna). In particular, the reference region web can be embodied to form a second antenna for a second frequency range about the second resonance frequency. The second frequency range can comprise in particular 2.4-2.5 GHz or correspond to this frequency interval.

A dual band antenna is therefore described, which can be used reliably in different installation environments and/or on different printed circuit board types by providing a reference region and an additional reference region web.

The antenna structure can be built to be substantially rectangular. In particular, the antenna structure can have an electrically conducting rectangle (for providing the antenna function). The length of the antenna structure which runs at right angles to the feed line can be larger here than the width of the antenna structure which runs parallel to the feed line. Furthermore, the longitudinal edge of the reference region web can be arranged parallel to the longitudinal edge of the antenna structure which runs along the length of the antenna structure. A reliable electromagnetic and/or capacitive coupling can therefore be effected between the reference region web and the antenna structure. In particular, the reference region web and the antenna structure can be coupled capacitively with one another by way of an electrically insulating clearance arranged between the longitudinal edge of the antenna structure and the longitudinal edge of the reference region web.

In a preferred example the clearance between the longitudinal edge of the antenna structure and the longitudinal edge of the reference region web can have a width of F*2.2 mm±10%, wherein F is any real-value scaling factor, with in particular F=1.

The antenna structure can have a specific length along the longitudinal edge of the antenna structure, wherein the length of the antenna structure depends on the first resonance frequency. In particular, the setting of the length of the antenna structure can typically be used to set the first resonance frequency. In a preferred example, the length of the antenna structure is F*11.4 mm±10%. Furthermore, in a preferred example the width of the antenna structure is F*2.4 mm±10%.

Correspondingly the reference region web has a specific length along a longitudinal edge of the reference region web, wherein the length of the reference region web typically depends on the second resonance frequency. In particular, the setting of the length of the reference region web can be used to set the second resonance frequency. In a preferred example, the length of the reference region web is F*11.7 mm±10%. Furthermore, in a preferred example the width of the reference region web is F*1.5 mm±10%.

The antenna structure can be connected in an electrically conducting manner with the reference region, in particular with the second sub reference region of the reference region, by way of an electrically conducting antenna structure web (also referred to as short circuit web). Here the antenna structure web can run parallel to the feed line. Furthermore, the antenna structure web can have a substantially greater length, which runs parallel to the feed line, than width (running at right angles to the feed line), in particular by a factor of 10 or more.

The feed line and/or the antenna structure web typically run at right angles to a longitudinal direction or longitudinal edge of the antenna structure. Furthermore, the antenna structure web can be arranged at one end and/or at a transverse edge of the antenna structure (in particular at the end or at the transverse edge, which faces the second sub reference region). In a preferred example, the antenna structure web has a width of F*0.9 mm±10%. Furthermore, in a preferred example the antenna structure web (in particular an edge of the antenna structure web facing the feed line) can have a distance of F*5.7 mm±10% in relation to the feed line.

The impedance of the antenna structure can be set in an efficient and precise manner by using an electrically conducting antenna structure web. Furthermore, the required size of the antenna structure can be reduced. Furthermore, electrostatic discharges can be reliably kept away from the transmit/receive electronics of the described antenna by way of the (short circuit) web in relation to the reference region, in particular in relation to the second sub reference region.

As already shown above, the reference region can be divided by the feed recess and by the web recess into a first sub reference region and into a second sub reference region. The division can be such that the first sub reference region and the second sub reference region are not coupled with one another in a directly electrically conducting manner on the outer layer (but instead possibly only indirectly with another layer of the printed circuit board by way of a through-connection).

The second sub reference region can have an L shape. Furthermore, the first sub reference region can have an L shape arranged mirror-inverted (possibly in respect of the feed line) in relation to the second sub reference region, on which the reference region web is arranged parallel to a limb of the L shape which runs at right angles to the feed line. The first sub reference region and the second sub reference region can therefore (with the exception of the additional reference region web) have the same shape and/or the same dimensions and possibly be arranged mirror-inverted in respect of the feed line. An antenna can therefore be provided, which can be used in a particularly flexible manner in different constellations.

In a preferred example, a limb of the first sub reference region and/or of the second sub reference region which extends parallel to the feed line has in each case a length of F*7.4 mm±10% (running parallel to the feed line) (starting from a longitudinal edge of the reference region which faces the antenna structure). Furthermore, in a preferred example, the longitudinal edge of the antenna structure (facing the reference region) can have a distance of F*1.3 mm±10% in relation to the longitudinal edge of the limb of the first sub reference region and/or of the second sub reference region running at right angles to the feed line.

The printed circuit board antenna can comprise an electrically conducting further outer layer of the printed circuit board. Furthermore, the printed circuit board antenna can comprise an electrically conducting further reference region on the further outer layer. Here the reference region (of the (first) outer layer) can be connected in an electrically conducting manner with the further reference region (of the further outer layer) by way of one or more through-connections.

The reference region can have a U shape (which is composed of the two afore-cited L-shaped sub reference regions) without the reference region web and without the feed recess. Here the antenna structure can be enclosed on three sides by the U shape of the reference region. Furthermore, the reference region web can enclose at least one part of the fourth side of the antenna structure (and run parallel thereto).

The further reference region can likewise have a U shape. Here, in a preferred example, the U-shape of the further reference region and the U shape of the reference region can be dimensioned identically and/or arranged directly one above the other. An antenna which can be used particularly flexibly can therefore be provided.

As already shown above, the (first) outer layer and/or the further (second) outer layer are typically formed in each case by an electrically conducting layer, in particular by a copper layer, of a printed circuit board. Furthermore, the outer layer and the further outer layer are typically insulated from one another by means of at least one dielectric layer.

Furthermore, a printed circuit board can have at least one electrically conducting intermediate layer (e.g. a copper layer), which is arranged between the outer layer and the further outer layer. The intermediate layer, in a region of the antenna structure and/or of the reference region web (and of the clearance arranged therebetween), preferably has no electrically conducting material (in particular no copper). On the other hand, the intermediate layer in one region of the reference region can be connected in an electrically conducting manner with the reference region by way of one or more through-connections. Therefore a printed circuit board antenna can also be provided in an efficient and precise manner even with a printed circuit board having one or more intermediate layers, According to a further aspect, a household appliance, in particular a household appliance, is described, which comprises a communication unit for wireless communication (in particular by way of WLAN), wherein the communication unit has the printed circuit board antenna described in this document.

It should be noted that the apparatuses and systems described in this document can be used both alone and also in combination with other apparatuses and systems described in this document. Furthermore, any aspects of the apparatuses and systems described in this document can be combined with one another in a variety of ways. In particular, the features of the claims can be combined with one another in a variety of ways.

The invention is described in more detail below on the basis of exemplary embodiments. In the drawings:

DETAILED DESCRIPTION OF THE INVENTION

As presented in the introduction, the present document relates to the provision of a (dual band) antenna, which can be integrated efficiently on differently dimensioned and/or designed printed circuit boards and/or in different environments. The (dual band) antenna should be designed here in particular for WLAN radio communication in the frequency bands at 2.5 GHz and at 5 GHz.

Figure 1A:
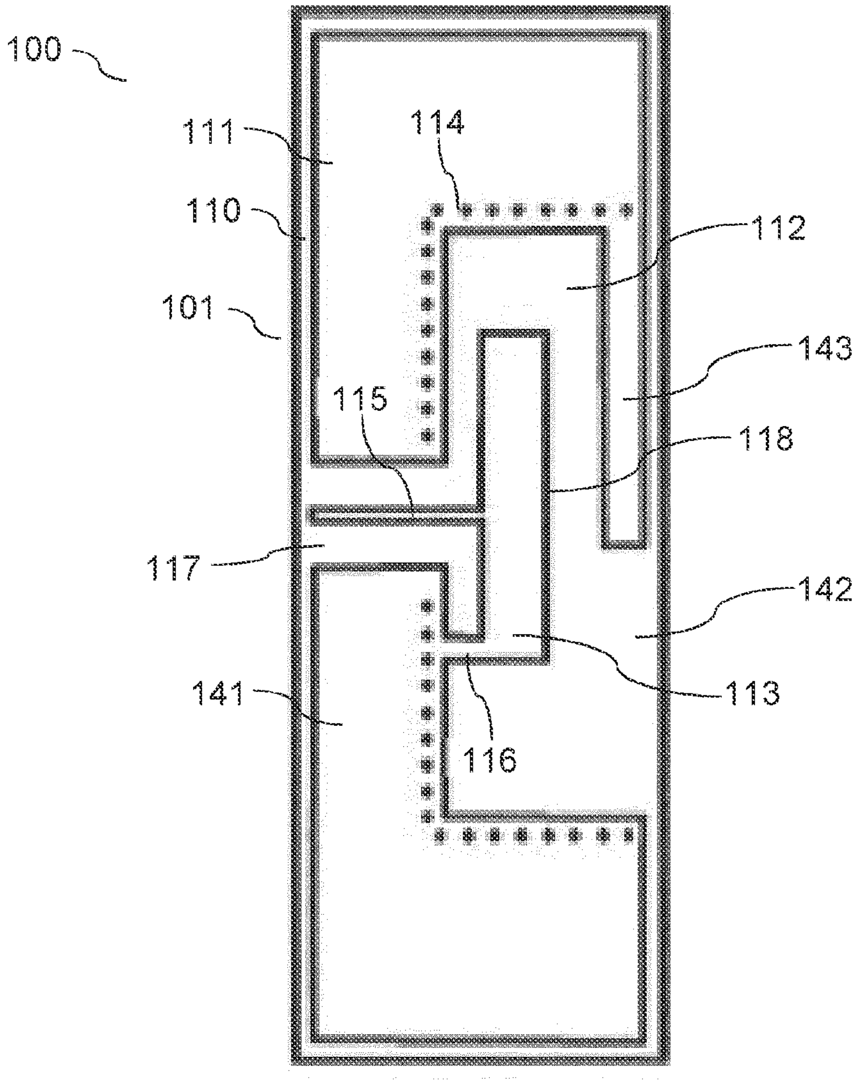
FIG. 1*a* shows the upper or the (first) outer layer of a printed circuit board with an antenna.
Figure 1B:
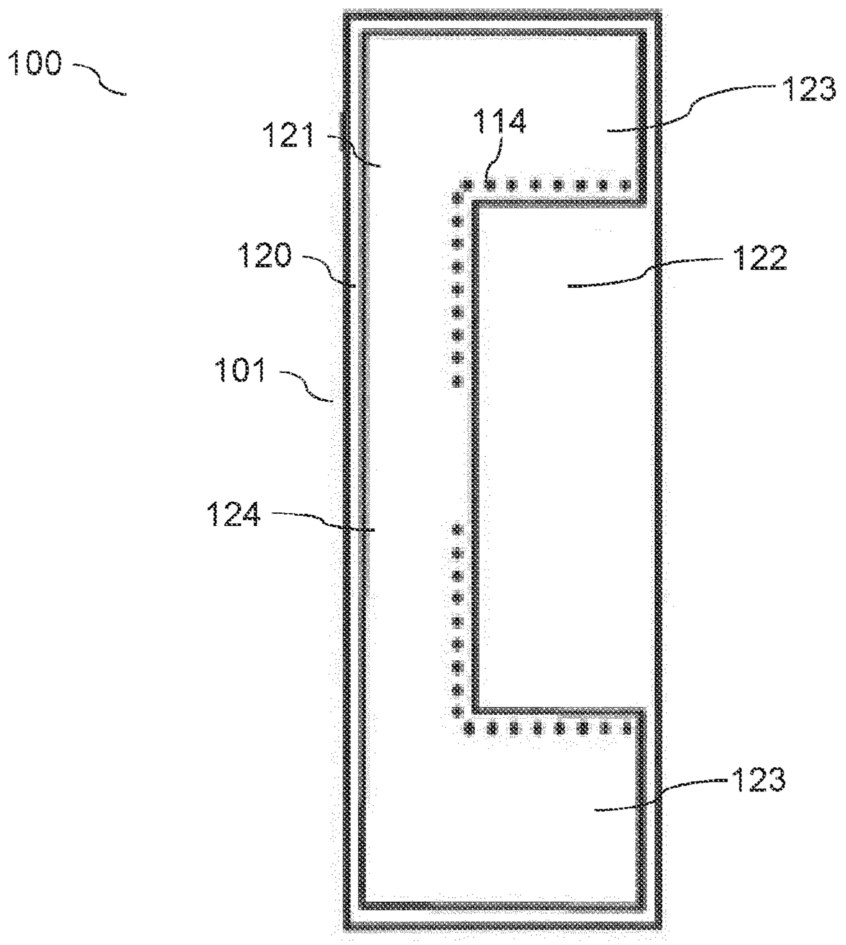
FIG. 1*b* shows the lower layer or the second or further outer layer of a printed circuit board.
Figure 1C:
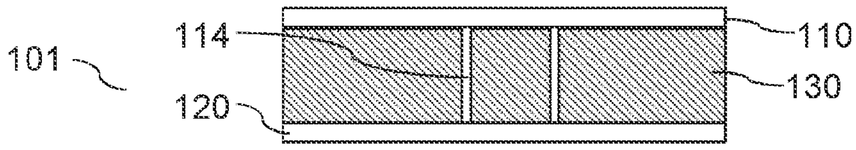
FIGS. 1*c* and 1*d* show cross-sections through printed circuit boards with an antenna in each case.
Figure 1D:
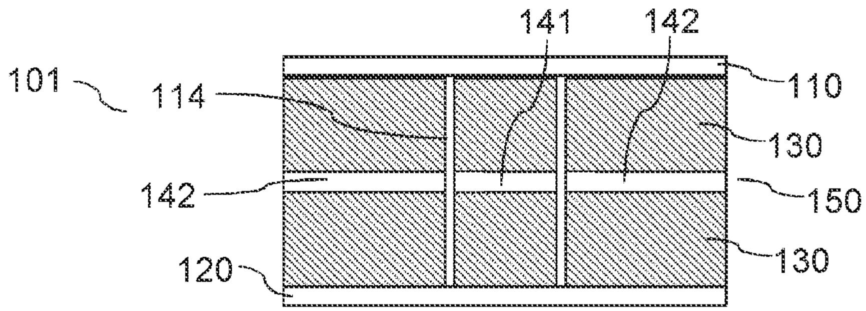

FIGS. 1*a* and 1*b* show an exemplary antenna 100 which is integrated on a printed circuit board 101. In particular, FIG. 1*a* shows the (electrically conducting) upper layer 110 of the printed circuit board 101 and FIG. 1*b* shows the (electrically conducting) lower layer 120 of the printed circuit board. As shown in FIGS. 1*c* and 1*d*, one or more dielectric layers 130 and possibly one or more (electrically conducting) intermediate layers 150 are located between the upper layer 110 and the lower layer 120. The electrically conducting layers 110, 120, 150 can have a layer made from metal, in particular copper. The metal can be removed in subregions of the layers 110, 120, 150 (e.g. be etched away) in order to form different electrically conducting sub regions within a layer 110, 120, 150, wherein the subregions are insulated electrically from one another.

The upper layer 110 has an electrically conducting antenna structure 113, which is insulated from an electrically conducting reference region 111, 141 by way of an (electrically non-conducting) clearance 112. The reference region 111, 141 encloses the antenna structure 113 at least partially. In this way the reference region 111, 141 enclosing the antenna structure 113 is interrupted at a first point, in order to form a clearance or a recess 117, through which an electrically conducting feed line 115 can be guided to the antenna structure 113. Furthermore, the reference region 111, 141 has a second recess 142, in order to form a reference region web 143 which runs parallel to the antenna structure 113. On account of the two recesses 117, 142, the reference region 111, 141 is therefore divided into two sub reference regions, in particular a first sub reference region 111 and a second sub reference region 141. The reference region web 143 is connected here in an electrically conducting manner to the first sub reference region 111.

In the example shown in FIG. 1*a*, the antenna structure 113 has a rectangular shape. The antenna structure 113 can be used here for emitting and/or for receiving signals in a specific first frequency range (approx. 5.1-5.8 GHz). In particular, the antenna structure 113 can form an $\gamma/4$ emitter for a specific first frequency range on account of the overall length 205 of the antenna structure 113.

On the other hand, the clearance 112 between the antenna structure 113 and the reference region web 143 of the reference region 111, 141, and/or the reference region web 143 itself can be used as a (slot) antenna for a further (second) frequency range (approx. 2.4-2.5 GHz). For this purpose, the clearance 112 and in particular the reference region web 143 can have a specific length 208, so that the clearance 112 and/or the reference region web 143 form an $\gamma/4$ emitter for a further (second) frequency range.

Furthermore, the antenna structure 113 can be connected in an electrically conducting manner with the reference region 111, 141, in particular with the second sub reference regions 141, by way of an electrically conducting antenna structure web (in particular by way of a short-circuit web) 116. The electrically conducting antenna structure web 116 can be arranged here at one end of the antenna structure 113, in particular at the narrowest transverse edge of the antenna structure 113. The antenna structure 113 can therefore form a (planar) inverted F antenna.

The impedance of the antenna structure 113 can be trimmed to a desired value (e.g. 50 Ohm) across the distance 206 between the web 116 and the feed point or the feed line 115. Moreover, electrostatic discharges can largely be kept away from the transmit/receive electronics of the antenna 100 by way of this short circuit web 116.

FIG. 1*b* shows the lower layer 120 of the printed circuit board 101. The lower layer 120 is designed to be at least partially identical to the upper layer 110. In particular, the lower layer 120, in the example shown, has a reference region 121, which (with the exception of the first recess 117, and with the exception of the web 143) is designed to be identical to the reference region 111, 141 of the upper layer 110. The reference region 121 here has a U shape, with a base 124 which runs parallel to the rectangular antenna structure 113 and two limbs 123.

The reference region 111 of the upper layer 110 can be connected in an electrically conducting manner with the reference region 121 of the lower layer 120 by way of one or more vias or through-connections 114. In FIGS. 1*a* and 1*b* the vias or through-connections 114 are shown as points. The precise position of the one or more vias or through-connections 114 can be different depending on via technology.

FIGS. 1*c* and 1*d* show exemplary cross-sections through exemplary printed circuit boards 101 with an antenna structure 113. Here a printed circuit board 101 between two electrically conducting layers 110, 120 has a dielectric and/or electrically insulating layer 130. In the example shown in FIG. 1*d*, the printed circuit board 101 between the upper layer 110 and the lower layer 120 has (at least) one electrically conducting intermediate layer 150, which is separated from the upper layer 110 or the lower layer 120 by a dielectric layer 130 in each case.

FIG. 1*d* shows the region 141, in which the antenna structure 113 including the clearance 112 shown in FIG. 1*a* are arranged. This region 151 of an intermediate layer 150 is typically to be recessed, so that the intermediate layer 150 in this region 151 has no electrically conducting material (in particular no copper). On the other hand, the remaining region 152 of an intermediate layer 150 can be connected in an electrically conducting manner with the reference region 111, 121 of the upper layer 110 and the lower layer 120 by way of the vias or through-connections 114.

Figure 2A:
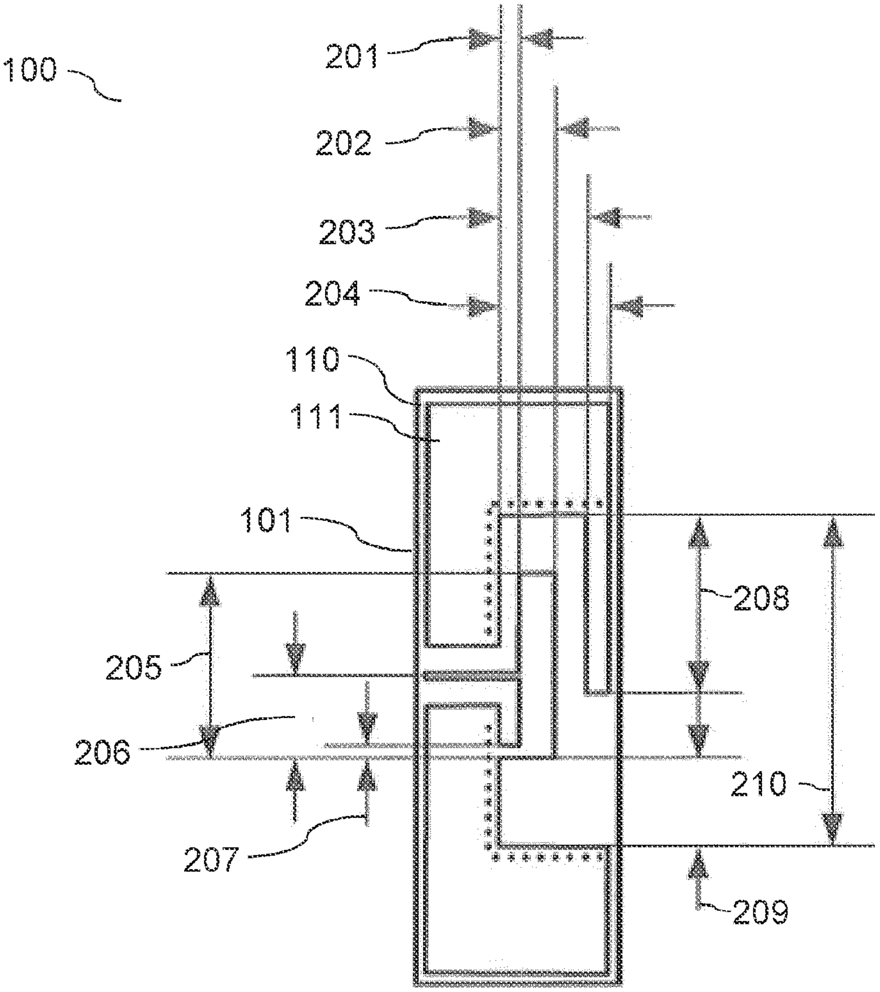
FIGS. 2*a* and 2*b* show exemplary dimensions of an antenna.
Figure 2B:
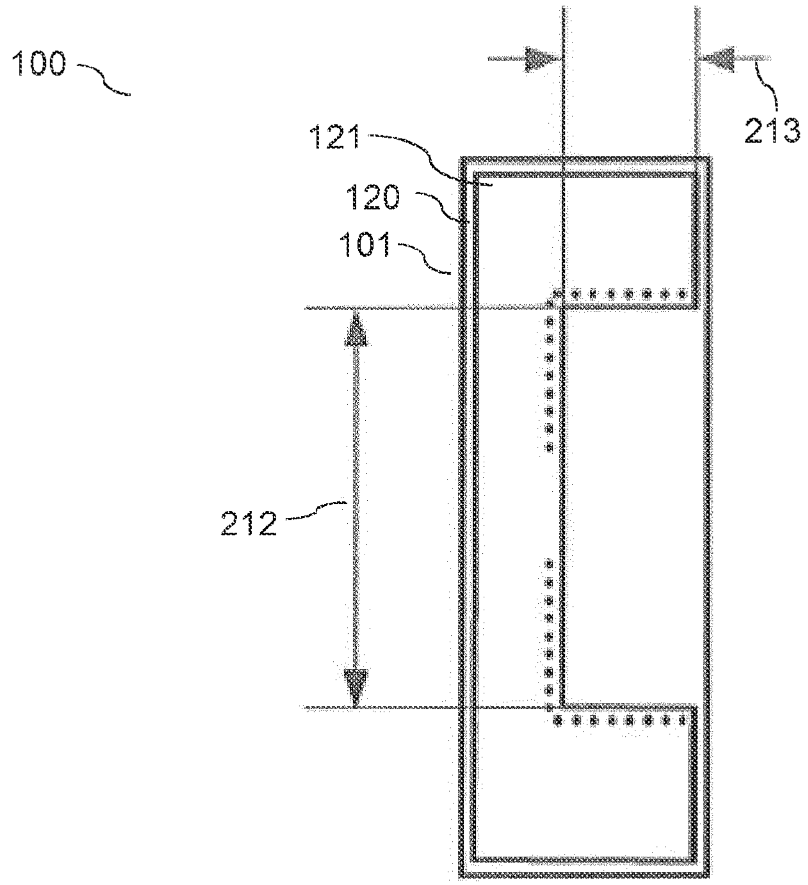

FIGS. 2*a* and 2*b* show different dimensions of the antenna 100 from FIGS. 1*a* and 1*b*. In particular, FIGS. 2*a* and 2*b* show

- the distance 201 between the longitudinal edge of the rectangle 118 of the antenna structure 113 facing the (interrupted) base (of the U shape) of the reference region 111, 141, and the (interrupted) base (of the U shape) of the reference region 111, 141;
- the distance 202 between the longitudinal edge of the rectangle 118 of the antenna structure 113 facing away from the (interrupted) base of the (U shape) of the reference region 111, 141, and the (interrupted) base (of the U shape) of the reference region 111, 141;
- the distance 203 between the longitudinal edge of the reference region web 143 facing the (interrupted) base (of the U shape) of the reference region 111, 141 and the (interrupted) base (of the U shape) of the reference region 111, 141;
- the distance 204 between the longitudinal edge of the reference region web 143 facing away from the (interrupted) base (of the U shape) of the reference region 111, 141 and the (interrupted) base (of the U shape) of the reference region 111, 141;
- the length 205 of the rectangle 118 of the antenna structure 113;
- the distance 206 of the feed line 117 from the antenna structure web 116;
- the width 207 of the antenna structure web 116;
- the length 208 of the reference region web 143;
- the distance 209 of the antenna structure web 116 from the edge of a limb of the second sub reference region 141 which runs parallel to the antenna structure web 116 and faces the clearance 112;
- the distance 210 of the edges of the limbs of the first sub reference region 111 and the second sub reference region 141 which face the clearance 112 and oppose one another;
- the distance 212 of the edges of the two limbs 123 of the reference region 121 of the lower layer 120 which face the clearance 122 and oppose one another; this distance 212 typically corresponds to the distance 210;
- the depth 213 of the limb 123 of the reference region 121 of the lower layer 120 (starting from the edge of the base 124 of the reference region 121 facing the clearance 122); this depth 213 typically corresponds to the distance 204.

Preferred values of the afore-cited dimensions of the antenna 100 (in particular for a dual band antenna for the frequency bands 2.4-2.5 GHz and 5.1-5.8 GHz) are:

- for the distance 201: 1.3 mm; and/or
- for the distance 202: 3.7 mm; and/or
- for the distance 203: 5.9 mm; and/or
- for the distance 204: 7.4 mm; and/or
- for the length 205: 11.4 mm; and/or
- for the distance 206: 5.7 mm; and/or
- for the width 207: 0.9 mm; and/or
- for the length 208: 11.7 mm; and/or
- for the distance 209: 5.7 mm; and/or
- for the distance 210: 21.3 mm; and/or
- for the distance 212: 21.3 mm; and/or
- for the depth 213: 7.4 mm The printed circuit board 101 can have e.g. a strength or thickness of 1.5 mm. A possible copper intermediate layer 150 preferably has a rectangular recess 151 of the size 7.7 mm×22 mm. Furthermore, the intermediate layer 150 can be connected to the reference regions 111, 141, 121 of the outer layers 110, 120 by way of external vias 114.

The afore-cited values can fluctuate in each case by up to ±10% (in particular in order to trim the resonance frequencies). Furthermore, the values can possibly be scaled with a shared factor F.

The printed circuit board antenna 100 can be arranged on a printed circuit board 101 with a size 49 mm×43 mm. Here a number of the described printed circuit board antennas 100 can be arranged on the printed circuit board 101, e.g. one antenna 100 on a long edge and on a short edge of the printed circuit board 101 in each case. The individual antennas 100 can be adjusted and/or optimized to the position within the printed circuit board 101 (e.g. by adjusting the afore-cited values of an antenna 100 in a region of ±10%).

A planar printed circuit board antenna structure 113 is therefore described, which is surrounded by the reference mass (i.e. by a reference region 111, 121, 141) or integrated into the reference mass. The reference regions 111, 121, 141 can be coupled in an electrically conducting manner with mass or ground. By integrating an antenna structure 113 in a reference region 111, 121, 141, the properties of the antenna 100 become independent of the size of the reference mass of a printed circuit board 101. As a result, the antenna 100 can be installed efficiently into circuit boards 101 of various sizes and/or into different environments, without having to change the antenna structure 113 and/or a "matching circuit". Consequently a module approval can be used for the described antenna 100 irrespective of the specific installation situation for various overall devices.

The described antenna 100 can be an extended form of a planar inverted F-shaped antenna (PIFA) (formed by the antenna structure 113). Here the antenna 110 has an additional resonator (formed by the reference region web 143 of the first sub reference region 111), as a result of which a second (relatively deep) resonance frequency is produced. The additional resonator can be capacitively excited by the inverted F antenna 113 by way of the intermediate space (i.e. the clearance 112) between the rectangle 118 of the inverted F antenna 113 and the reference region web 143. This capacitive coupling is preferably designed to be relatively weak, as a result of which the resonances of the inverted F antenna 113 and the reference region web 143 become relatively broadband.

By using relatively broadband resonators, the radiation behavior of the antenna 100 changes relatively little if the resonance frequencies are displaced (e.g. by plastic (for instance of the housing of a device) in the vicinity of the antenna 100, or through manufacturing tolerances). The quality of the antenna 100 is therefore relatively insensitive to manufacturing tolerances. Moreover, the antenna 100 can be operated in various installation situations, without the resources having to be displaced by adjusting the structure of the antenna 100 or by means of a "matching circuit". An approval of the antenna 100 can therefore be used independently of the installation situation for various overall devices.

Figure 3:
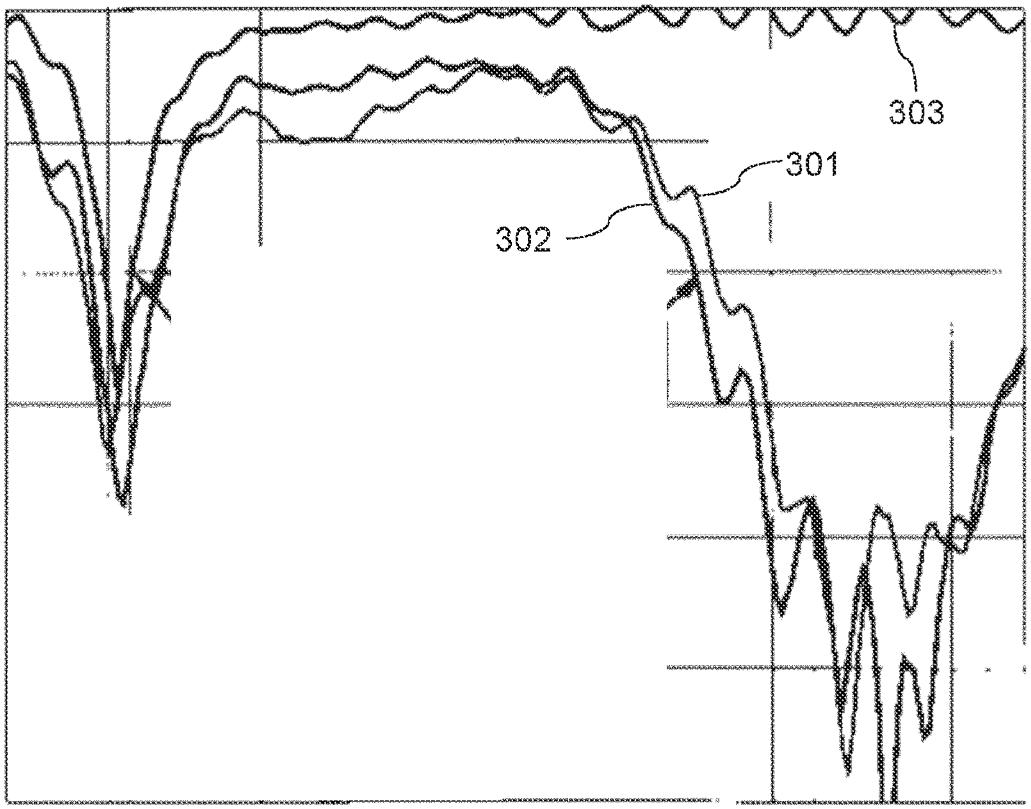
FIG. 3 shows exemplary frequency curves of differently dimensioned antennas.

FIG. 3 shows exemplary frequency responses 301, 302, 303 of different antennas. A resonance frequency in the frequency range 2.4-2.5 GHz is apparent for all antennas in the frequency responses 301, 302, 303. Two of the antennas (frequency responses 301, 302) additionally have a resonance frequency in the frequency range 5.1-5.8 GHz. It is apparent that the antennas with the two resonance frequencies in the respective frequency ranges are more broadband than the antenna which only has one resonance frequency. This therefore enables flexible use of the dual band antennas.

The present invention is not restricted to the exemplary embodiments shown. In particular, it should be noted that the description and the figures are only intended to illustrate the principle of the proposed apparatuses and systems.

The invention claimed is:

1. A printed circuit board antenna, comprising:

a printed circuit board having an outer layer;

an electrically conducting antenna structure disposed on said outer layer of said printed circuit board, wherein said electrically conducting antenna structure has a first resonance frequency;

an electrically conducting feed line leading to said electrically conducting antenna structure; and an electrically conducting reference region disposed on said outer layer, wherein said electrically conducting reference region completely encloses said electrically conducting antenna structure with an exception of an insulating feed recess for said electrically conducting feed line and an insulating web recess, wherein said insulating web recess being disposed on a side of said electrically conducting antenna structure facing away from said electrically conducting feed line, and wherein said electrically conducting reference region having a reference region web on a side of electrically conducting antenna structure facing away from said electrically conducting feed line, which forms a resonator with a second resonance frequency coupled capacitively to said electrically conducting antenna structure.

2. The printed circuit board antenna according to claim 1, wherein:

said electrically conducting antenna structure is substantially rectangular;

said electrically conducting antenna structure has a length running at right angles to said electrically conducting feed line being greater than a width of said electrically conducting antenna structure running parallel to said electrically conducting feed line;

said reference region web has a longitudinal edge disposed parallel to a longitudinal edge of said electrically conducting antenna structure running along said length of said electrically conducting antenna structure;

said reference region web and said electrically conducting antenna structure are coupled capacitively to one another by way of an electrically insulating clearance disposed between said longitudinal edge of said electrically conducting antenna structure and said longitudinal edge of said reference region web; and said electrically insulating clearance between said longitudinal edge of said electrically conducting antenna structure and said longitudinal edge of said reference region web has a width of F*2.2 mm±10%, where F is any real-value scaling factor.

3. The printed circuit board antenna according to claim 1, wherein:

said electrically conducting antenna structure forms a first antenna for a first frequency range about the first resonance frequency;

said reference region web forms a second antenna for a second frequency range about the second resonance frequency; and the first frequency range is between 5.1-5.8 GHz and the second frequency range is between 2.4-2.5 GHz.

4. The printed circuit board antenna according to claim 1, wherein:

said electrically conducting antenna structure has a length along a longitudinal edge of said electrically conducting antenna structure; and said length of said electrically conducting antenna structure depends on the first resonance frequency.

5. The printed circuit board antenna according to claim 4, wherein:

said length of said electrically conducting antenna structure is F*11.4 mm±10%; and/or a width of said electrically conducting antenna structure is F*2.4 mm±10%; and F is any real-value scaling factor.

6. The printed circuit board antenna according to claim 1, wherein:

said reference region web has a length along a longitudinal edge of said reference region web; and said length of said reference region web depends on the second resonance frequency.

7. The printed circuit board antenna according to claim 6, wherein:

said length of said reference region web is F*11.4 mm±10%; and/or a width of said reference region web is F*2.4 mm±10%; and F is any real-value scaling factor.

8. The printed circuit board antenna according to claim 1, wherein said electrically conducting reference region has first and second sub reference regions;

further comprising an electrically conducting antenna structure web;

wherein said electrically conducting antenna structure is connected in an electrically conducting manner with said electrically conducting reference region via said second sub reference region of said electrically conducting reference region, by way of said electrically conducting antenna structure web;

wherein said electrically conducting antenna structure web runs parallel to said electrically conducting feed line;

wherein said electrically conducting antenna structure web has a substantially greater length which runs parallel to said electrically conducting feed line than a width;

wherein said electrically conducting feed line runs at right angles to a longitudinal direction of said electrically conducting antenna structure;

wherein said electrically conducting antenna structure web is disposed at one end and/or at a transverse edge of said electrically conducting antenna structure;

wherein said electrically conducting antenna structure web has a width of F*0.9 mm±10%;

wherein said electrically conducting electrically conducting antenna structure web has a distance of F*5.7 mm±10% in relation to said electrically conducting feed line; and wherein F is any real-value scaling factor.

9. The printed circuit board antenna according to claim 1, wherein:

said electrically conducting reference region is divided into a first sub reference region and into a second sub reference region by means of said insulating feed recess and by means of said insulating web recess;

said first sub reference region and said second sub reference region are not coupled to one another in a directly electrically conducting manner on said outer layer;

said second sub reference region has an L shape;

said first sub reference region has an L shape disposed mirror-inverted in relation to said second sub reference region, relative to said electrically conducting feed line, extending from said L shape said reference region web is additionally disposed parallel to a limb of said L shape which runs at right angles to said electrically conducting feed line;

a limb of said first sub reference region and/or said second sub reference region which extends parallel to said electrically conducting feed line has a length of F*7.4 mm±10%;

a longitudinal edge of said electrically conducting antenna structure has a distance of F*1.3 mm±10% from said limb of said first sub reference region and/or of said second sub reference region which runs at right angles to said electrically conducting feed line; and F is any real-value scaling factor.

10. The printed circuit board antenna according to claim 1, wherein said printed circuit board has a further outer layer;

further comprising an electrically conducting further reference region disposed on said further outer layer; and wherein said electrically conducting reference region is connected in an electrically conducting manner with said electrically conducting further reference region by way of at least one through-connection running through said printed circuit board.

11. The printed circuit board antenna according to claim 10, wherein:

said electrically conducting reference region without said reference region web and without said insulating feed recess has a U shape;

said electrically conducting antenna structure is enclosed on three sides by said U shape of said electrically conducting reference region;

said further reference region has a U shape; and said U shape of said further reference region and said U shape of said electrically conducting reference region are dimensioned identically and disposed directly one above the other.

12. The printed circuit board antenna according to claim 10, wherein said outer layer and said further outer layer are formed in each case by an electrically conducting layer of said printed circuit board; and/or further comprising at least one dielectric layer, said outer layer and said further outer layer are insulated from one another by means of said at least one dielectric layer.

13. The printed circuit board antenna according to claim 12, wherein:

said printed circuit board has at least one electrically conducting intermediate layer, which is disposed between said outer layer and said further outer layer; and said at least one electrically conducting intermediate layer in a region of said electrically conducting antenna structure and/or said reference region web has no electrically conducting material; and/or said at least one electrically conducting intermediate layer in a region of said electrically conducting reference region is connected in an electrically conducting manner with said electrically conducting reference region by way of said at least one through-connection.

14. The printed circuit board antenna according to claim 1, wherein said electrically conducting reference region forms a reference mass for said electrically conducting antenna structure, so that the printed circuit board antenna is independent of a size of a reference mass.

15. The printed circuit board antenna according to claim 2, wherein F=1.

16. The printed circuit board antenna according to claim 5, wherein F=1.

17. The printed circuit board antenna according to claim 7, wherein F=1.

18. The printed circuit board antenna according to claim 8, wherein said electrically conducting antenna structure web has a greater length which runs parallel to said electrically conducting feed line than a width by a factor 10 or more.

19. The printed circuit board antenna according to claim 12, wherein said electrically conducting layer is a copper layer.

20. A household appliance, comprising:

a communication unit having a printed circuit board antenna according to claim 1.

* * * * *